United States Patent
Odashima et al.

(10) Patent No.: US 11,769,334 B2
(45) Date of Patent: Sep. 26, 2023

(54) IMAGE COLLECTION SYSTEM AND IMAGE COLLECTION METHOD

(71) Applicant: HONDA MOTOR CO., LTD., Tokyo (JP)

(72) Inventors: Shigeyuki Odashima, Tokyo (JP); Ryusuke Tamanaha, Tokyo (JP); Tomoaki Hagihara, Tokyo (JP); Kousuke Suzuki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/686,483

(22) Filed: Mar. 4, 2022

(65) Prior Publication Data
US 2022/0292839 A1 Sep. 15, 2022

(30) Foreign Application Priority Data

Mar. 9, 2021 (JP) .................................. 2021-036891

(51) Int. Cl.
*G06V 20/58* (2022.01)
*H04N 7/18* (2006.01)
(Continued)

(52) U.S. Cl.
CPC ................ *G06V 20/58* (2022.01); *G06T 7/70* (2017.01); *G06V 20/588* (2022.01); *H04N 7/18* (2013.01); *G06T 2207/30256* (2013.01)

(58) Field of Classification Search
CPC ........ G06V 20/58; G06V 20/588; G06T 7/70; G06T 2207/30256; H04N 7/18
See application file for complete search history.

(56) References Cited

U.S. PATENT DOCUMENTS 10,972,649 B2 * 4/2021 Casey ..................... G01S 19/13
11,093,759 B2 * 8/2021 Doria .................... G06V 20/588
(Continued)

FOREIGN PATENT DOCUMENTS

CN         107399321 A    11/2017
JP         2002-117496 A   4/2002
(Continued)

OTHER PUBLICATIONS

Japanese Office Action dated Jan. 24, 2023 issued in corresponding Japanese application No. 2021-036891; English machine translation included (9 pages).

(Continued)

*Primary Examiner* — Boubacar Abdou Tchoussou
(74) *Attorney, Agent, or Firm* — Rankin, Hill & Clark LLP

(57) ABSTRACT

An image collection system includes: a captured-image analysis unit that determines whether a captured image, captured by a camera mounted on a mobile object, of surroundings of the mobile object is a first captured image including an image portion of a specified monitoring target object; an image-capturing-condition recognition unit that recognizes a first image-capturing condition that is an image-capturing condition at the time when the camera captures the first captured image; and a monitoring-target-object-information providing unit that transmits monitoring-target-object image information in which the first captured image and the first image-capturing condition are associated with each other, to a specified provision destination.

9 Claims, 4 Drawing Sheets

(51) Int. Cl.
*G06T 7/70* (2017.01)
*G06V 20/56* (2022.01)

(56) References Cited

U.S. PATENT DOCUMENTS

| | | | |
|---|---|---|---|
| 11,228,501 B2* | 1/2022 | Jotshi | H04L 41/145 |
| 11,255,661 B2* | 2/2022 | Goto | G01C 15/00 |
| 11,361,547 B2* | 6/2022 | Aoki | G06V 10/98 |
| 2010/0169983 A1 | 7/2010 | Horr et al. | |
| 2017/0332010 A1 | 11/2017 | Asakura et al. | |
| 2019/0279049 A1* | 9/2019 | Doria | G06V 20/588 |
| 2020/0275011 A1* | 8/2020 | Casey | G06T 7/70 |
| 2020/0394415 A1* | 12/2020 | Aoki | G06V 20/46 |
| 2020/0396134 A1* | 12/2020 | Jotshi | G06T 7/70 |
| 2021/0025696 A1* | 1/2021 | Goto | G01S 7/4808 |
| 2022/0215572 A1* | 7/2022 | Niigaki | G01C 15/00 |
| 2022/0260719 A1* | 8/2022 | Tsuboi | G01C 15/00 |
| 2022/0392247 A1* | 12/2022 | Kudo | H04N 7/18 |

FOREIGN PATENT DOCUMENTS

| | | |
|---|---|---|
| JP | 2009-109262 A | 5/2006 |
| JP | 2010-148100 A | 7/2010 |
| JP | 2016-39513 A | 3/2016 |
| JP | 2020-13556 A | 1/2020 |
| JP | 2020-53795 A | 4/2020 |
| JP | 2020-177677 | 10/2020 |
| TW | 2010-26058 A | 7/2010 |

OTHER PUBLICATIONS

Ryosuke Ito, Susumu Ishihara, "A context-based shooting location selection scheme for on-board camera images in response to driver's ambiguous requests", Multimedia, Distributed, Cooperative, and Mobile Symposium (DICOMO2015), Information Processing Society of Japan; Jul. 1, 2015, vol. 2015, No. 1, p. 995-1002 (Year: 2015).

Chinese Office Action from corresponding application No. 202210202712.6, dated Apr. 24, 2023, 10 pages.

* cited by examiner

FIG.3

| MONITORING TARGET OBJECT | MAILBOX | UTILITY POLE | |
|---|---|---|---|
| MONITORING PURPOSE | CRACK | HINDRANCE OBJECT | CRACK |
| IMAGE-CAPTURING CONDITION | NEAR IMAGE | DISTANT IMAGE | NEAR IMAGE |
| PROVISION DESTINATION | POST OFFICE REPAIR COMPANY | POWER COMPANY MAINTENANCE COMPANY | POWER COMPANY REPAIR COMPANY |

FIG.4

| MONITORING TARGET OBJECT | MAILBOX | UTILITY POLE | |
|---|---|---|---|
| MONITORING PURPOSE | CRACK | HINDRANCE OBJECT | CRACK |
| IMAGE-CAPTURING CONDITION | NEAR IMAGE | DISTANT IMAGE NEAR IMAGE | NEAR IMAGE |
| PROVISION DESTINATION | POST OFFICE REPAIR COMPANY | POWER COMPANY MAINTENANCE COMPANY | POWER COMPANY REPAIR COMPANY |

IMAGE COLLECTION SYSTEM AND IMAGE COLLECTION METHOD

INCORPORATION BY REFERENCE

The present application claims priority under 35 U.S.C. § 119 to Japanese Patent Application No. 2021-036891 filed on Mar. 9, 2021. The content of the application is incorporated herein by reference in its entirety.

BACKGROUND OF THE INVENTION

Field of the Invention

The present invention relates to an image collection system and an image collection method.

Description of the Related Art

There has been proposed a system that collects images captured by a drive recorder mounted on a vehicle (for example, see Japanese Patent Laid-Open No. 2020-177677). The above system transmits, to a vehicle, signals that specify a place and request transmission of image data on the place, and the vehicle extracts image data satisfying the request out of the image data captured and stored by the drive recorder and transmits the extracted image data to the above system.

SUMMARY OF THE INVENTION

With the above system, it is possible to effectively use image data captured by the drive recorder of each vehicle and obtain captured images of the specified place such as an accident site. However, depending on the condition of capturing images of the target object by the vehicle, there are cases in which captured images necessary for monitoring the target object cannot be obtained.

The present invention has been made in light of the above background, and an object thereof is to provide an image collection system and an image collection method that make it possible to collect favorable captured images of monitoring target objects.

A first aspect to achieve the above object is an image collection system including: a captured-image analysis unit that determines whether a captured image, captured by a camera mounted on a mobile object, of surroundings of the mobile object is a first captured image including an image portion of a specified monitoring target object; an image-capturing-condition recognition unit that recognizes a first image-capturing condition that is an image-capturing condition at the time when the camera captures the first captured image; and a monitoring-target-object-information providing unit that transmits monitoring-target-object image information in which the first captured image and the first image-capturing condition are associated with each other, to a specified provision destination.

The above image collection system may have a configuration in which the first image-capturing condition includes the distance between the mobile object and the monitoring target object.

The above image collection system may have a configuration in which the first image-capturing condition includes the resolution of the image portion of the monitoring target object in the first captured image.

The above image collection system may have a configuration in which the monitoring target object is a target object installed around a road, and the first image-capturing condition includes the installation position of the monitoring target object on the road and the traveling direction of the mobile object on the road at the time when the camera captures the first captured image.

The above image collection system may have a configuration in which the monitoring target object is a target object installed around a road, and the first image-capturing condition includes the installation position of the monitoring target object on the road and a lane in which the mobile object is traveling on the road when the camera captures the first captured image.

The above image collection system may have a configuration in which the image collection system further includes: a necessary-image-capturing-condition setting unit that sets a necessary image-capturing condition based on at least one of the type and a monitoring purpose of the monitoring target object; and a captured-image selection unit that selects, out of the first captured images, a second captured image in which the first image-capturing condition satisfies the necessary image-capturing condition, and the monitoring-target-object-information providing unit transmits the monitoring-target-object image information on the second captured image to the provision destination.

The above image collection system may have a configuration in which the necessary-image-capturing-condition setting unit sets, out of a plurality of image-capturing conditions determined based on at least one of the type and the monitoring purpose of the monitoring target object, an image-capturing condition that matches the positions of the monitoring target object and the mobile object, as the necessary image-capturing condition.

The above image collection system may have a configuration in which the necessary image-capturing condition includes a condition that the distance between the monitoring target object and the mobile object is within a specified range.

The above image collection system may have a configuration in which the monitoring target object is a target object installed around a road, and the necessary image-capturing condition includes a condition that a lane in which the mobile object is traveling on the road when the camera captures the first captured image is a specified lane.

A second aspect to achieve the above object is an image collection method that is executed by a computer, including: a captured-image analysis step of determining whether a captured image, captured by a camera mounted on a mobile object, of surroundings of the mobile object is a first captured image including an image portion of a specified monitoring target object; an image-capturing-condition recognition step of recognizing a first image-capturing condition that is an image-capturing condition at the time when the camera captures the first captured image; and a monitoring-target-object-information providing step of transmitting monitoring-target-object image information in which the first captured image and the first image-capturing condition are associated with each other, to a specified provision destination.

The above image collection system makes it possible to collect favorable captured images of monitoring target objects.

BRIEF DESCRIPTION OF THE DRAWINGS

FIG. 3 is a table for setting necessary image-capturing conditions and contacts; and FIG. 4 is another table for setting necessary image-capturing conditions and contacts.

DETAILED DESCRIPTION OF THE PREFERRED EMBODIMENTS

1. Configuration of Image Collection System

Figure 1:
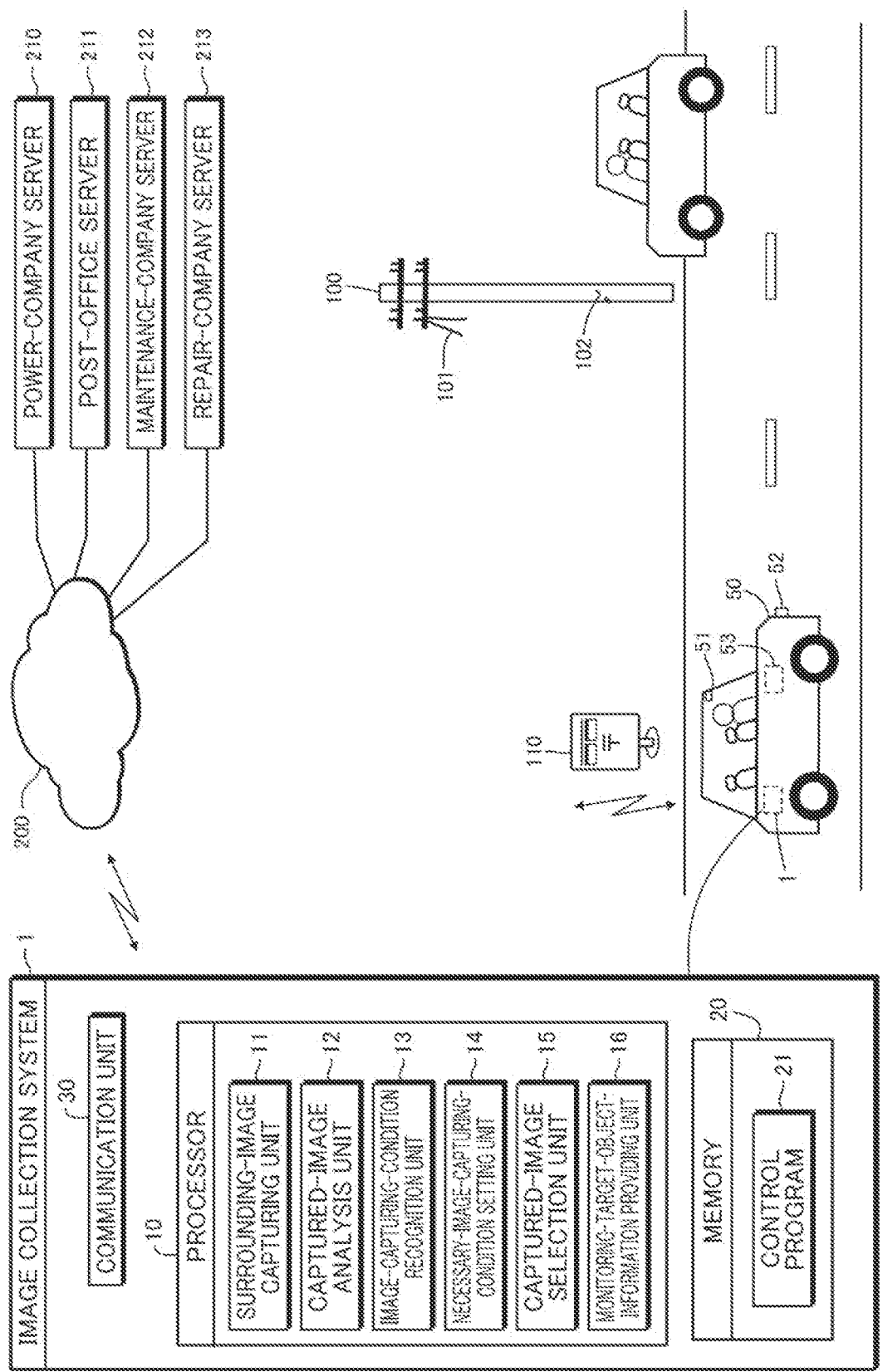
FIG. 1 is a configuration diagram of an image collection system.

With reference to FIG. 1, the configuration of an image collection system 1 of the present embodiment will be described. The image collection system 1 is mounted on a vehicle 50. The vehicle 50 includes a camera 51 that captures images of the surroundings of the vehicle 50, a global navigation satellite system (GNSS) sensor 53 that detects the position of the vehicle 50, and a radar 52 that detects the positions of objects present around the vehicle 50. The vehicle 50 corresponds to a mobile object in the present disclosure.

An image collection system 1 is a computer system including a processor 10, memory 20, a communication unit 30, and the like. The processor 10 corresponds to a computer of the present disclosure. The image collection system 1, by using the communication unit 30, communicates with a power-company server 210, a post-office server 211, a maintenance-company server 212, a repair-company server 213, and the like via a communication network 200.

FIG. 1 shows the vehicle 50 capturing images of monitoring target objects installed by the roadside by using the camera 51 while traveling on the road. In the present embodiment, utility poles and mailboxes are set as monitoring target objects, and FIG. 1 shows the image collection system 1 capturing an image of a utility pole 100 by the roadside. The utility pole 100 is installed on the side of the lane opposite to the lane in which the vehicle 50 is traveling.

The processor 10 reads and executes a control program 21 stored in the memory 20 to function as a surrounding-image capturing unit 11, a captured-image analysis unit 12, an image-capturing-condition recognition unit 13, a necessary-image-capturing-condition setting unit 14, a captured-image selection unit 15, and a monitoring-target-object-information providing unit 16. Here, processes executed by the captured-image analysis unit 12 correspond to a captured-image analysis step in an image collection method of the present disclosure, and processes executed by the image-capturing-condition recognition unit 13 correspond to an image-capturing-condition recognition step in the image collection method of the present disclosure. Processes executed by the monitoring-target-object-information providing unit 16 correspond to a monitoring-target-object-information providing step in the image collection method of the present disclosure.

The surrounding-image capturing unit 11 captures images of surroundings of the vehicle 50 with the camera 51 and stores captured images into the memory 20 associated with the image-capturing conditions. The image-capturing conditions include the following (1) to (5). (1) Specifications of the camera 51 (the resolution, the focal length of the lens, the mounting position of the camera 51 in the vehicle 50, and the like). (2) The position of the vehicle 50 at the time when the image was captured. The position of the vehicle 50 is detected by the GNSS sensor 53. (3) The date and time of the image-capturing. (4) The position relative to the vehicle 50 of the target object included in the captured image, and the distance between the target object and the vehicle 50. The position of the target object relative to the vehicle 50 and the distance between the vehicle 50 and the target object are calculated based on detection information by the radar 52. The position of the target object relative to the vehicle 50 may be expressed by the "direction" of the target object viewed from the vehicle 50 or the camera 51, instead of by the relative/absolute position in a coordinate system of the camera 51 or the real space. (5) The position of the monitoring target object on the road, and the traveling direction of the vehicle 50 on the road. The traveling direction of the vehicle 50 is recognized based on change in the position of the vehicle 50 detected by the GNSS sensor 53.

The captured-image analysis unit 12 analyzes captured images stored in the memory 20 and extracts image portions of target objects. The captured-image analysis unit 12 determines from features of the image portion of a target object whether a captured image is a first captured image including an image portion of a monitoring target object (a utility pole or a mailbox in the present embodiment). The image-capturing-condition recognition unit 13 recognizes a first image-capturing condition which is the image-capturing condition at the time when the first captured image was captured.

The necessary-image-capturing-condition setting unit 14, according to the type and the monitoring purpose of the monitoring target object included in the first captured image, sets a necessary image-capturing condition to determine whether the first captured image is a second captured image that can be used for monitoring, based on a setting table illustrated in FIG. 3. For example, in the case in which the monitoring target object is a utility pole, and the monitoring purpose is a hindrance object caught on a utility pole, the "distant image" is set as the necessary image-capturing condition. For the "distant image", specifically, the distance between the vehicle 50 and the monitoring target object is set to be within a specified distance range.

In the example illustrated in FIG. 1, the "distant image" is an image-capturing condition in which the image is captured in a state in which the vehicle 50 is away from the utility pole in such a degree that the entire view of the utility pole 100 is included in the captured image, and it is assumed that from the captured image, it is possible to determine whether there is a hindrance object 101. Alternatively, the captured image may cover at least part of the utility pole 100 in such a degree that the individual of the utility pole 100 can be identified based on the shape or surrounding conditions of the utility pole 100. The condition "near image capturing" is an image-capturing condition in which the image is captured from a position close to the utility pole 100 to some degree, and it is assumed that from the captured image, it is possible to check if there is a crack 102 in the utility pole 100.

The captured-image selection unit 15 selects, out of the first captured images, second captured images that their first image-capturing conditions satisfy the necessary image-capturing condition. The monitoring-target-object-information providing unit 16 transmits monitoring-target-object image information in which second captured images are associated with the image-capturing conditions at the time when the second captured images were captured, to the contacts selected based on to the setting table illustrated in FIG. 3. For example, in the case in which the monitoring target object is a utility pole, and the monitoring purpose is a hindrance object, the monitoring-target-object-information providing unit 16 transmits the monitoring-target-object image information to the power-company server 210 and the maintenance-company server 212.

2. Image Collection Process

Based on the flowchart illustrated in FIG. 2, a description will be given of execution procedure of an image collection process executed by the image collection system 1 mounted on the vehicle 50 in the situation illustrated in FIG. 1.

Figure 2:
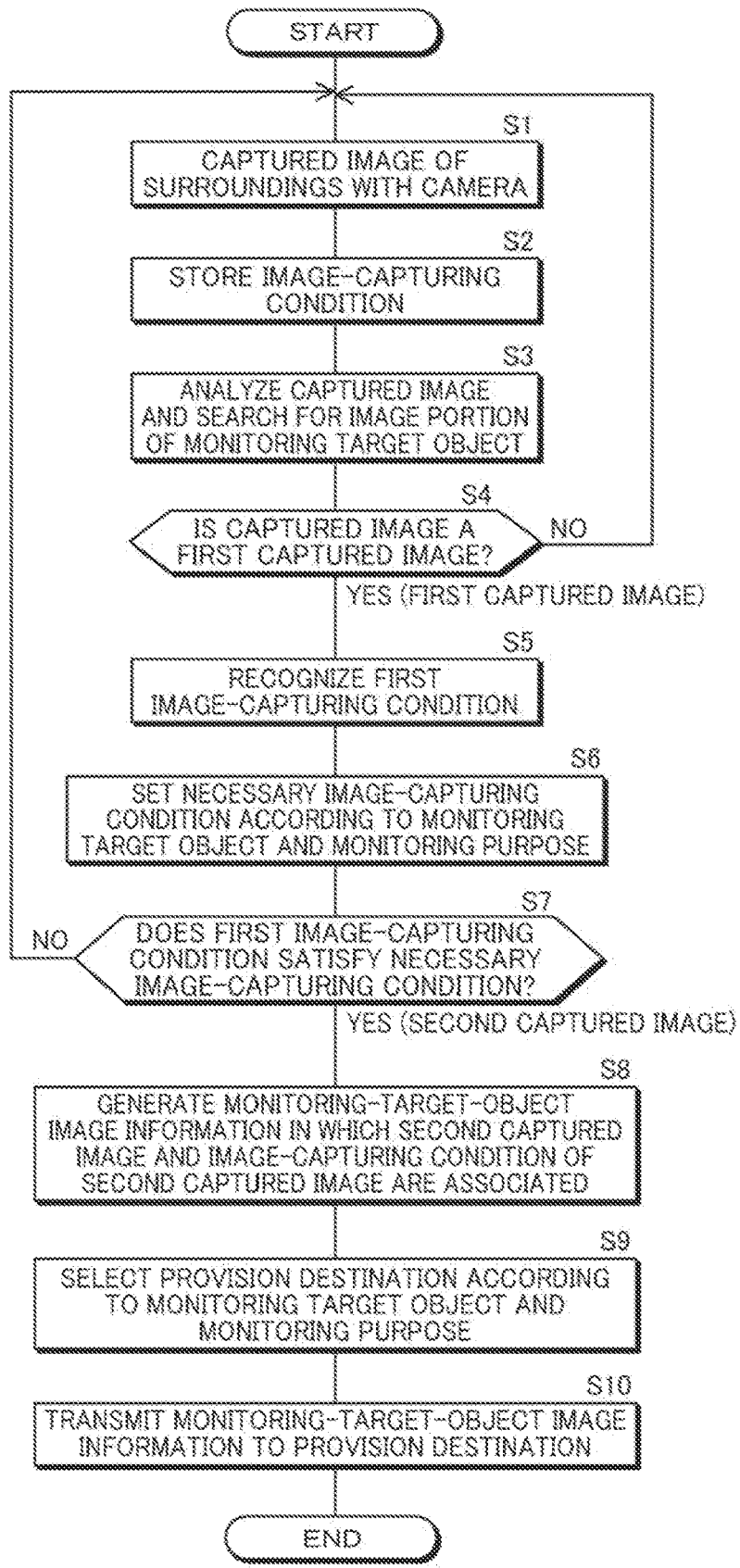
FIG. 2 is a flowchart of an image collection process.

In step S1 in FIG. 2, the surrounding-image capturing unit 11 captures an image of the surroundings with the camera 51 and stores the captured image into the memory 20. In the next step S2, the surrounding-image capturing unit 11 stores the above image-capturing conditions (1) to (5) into the memory 20. In the succeeding step S3, the captured-image analysis unit 12 analyzes and searches the captured image for image portions of the monitoring target objects. In the next step S4, the captured-image analysis unit 12 determines whether the captured image is a first captured image that includes an image portion of a monitoring target object.

In the example of FIG. 1, a first captured image including an image portion of the utility pole 100 is obtained. Then, the captured-image analysis unit 12, if the captured image is a first captured image, advances the process to step S5, and, if the captured image is not a first captured image, advances the process to step S1. In step S5, the image-capturing-condition recognition unit 13 refers to the memory 20 to recognize the first image-capturing condition which is the image-capturing condition at the time when the first captured image was captured.

In the succeeding step S6, the necessary-image-capturing-condition setting unit 14 sets a necessary image-capturing condition according to the monitoring target object and the monitoring purpose based on the setting table illustrated in FIG. 3. In the example of FIG. 1, in the case in which the monitoring target object is a utility pole 100, and the monitoring purpose is a hindrance object 101, the "distant image" is set as the necessary image-capturing condition. In the next step S7, the captured-image selection unit 15 determines whether the first image-capturing condition satisfies the necessary image-capturing condition. Then, the captured-image selection unit 15, if the first image-capturing condition satisfies the necessary image-capturing condition, advances the process to step S8, and, if the first image-capturing condition does not satisfy the necessary image-capturing condition, advances the process to step S1.

In step S8, the monitoring-target-object-information providing unit 16 generates monitoring-target-object image information in which the second captured image is associated with the image-capturing condition of the second captured image. In the succeeding step S9, the monitoring-target-object-information providing unit 16 selects provision destinations according to the monitoring target object and the monitoring purpose based on the setting table illustrated in FIG. 3. In the example of FIG. 1, in the case in which the monitoring target object is a utility pole 100, and the monitoring purpose is a hindrance object 101, the monitoring-target-object-information providing unit 16 selects the power-company server 210 and the maintenance-company server 212 as the provision destinations.

In the next step S10, the monitoring-target-object-information providing unit 16 transmits the monitoring-target-object image information to the power-company server 210 and the maintenance-company server 212. Persons in charge at the electric power company and the maintenance company check the image portion of the monitoring target object included in the second captured image included in the monitoring-target-object image information received by the power-company server 210 and the maintenance-company server 212, and thus they can perform inspection and maintenance of the utility pole 100.

3. Other Embodiments

Although in the above embodiment, examples of a utility pole and a mailbox installed on the road are illustrated as monitoring target objects, the monitoring target object may be other types of target objects installed on the road such as traffic signals, traffic signs, and guardrails.

Although the above embodiment includes the necessary-image-capturing-condition setting unit 14, and the monitoring-target-object image information transmitted is limited only to captured images captured in the image-capturing conditions satisfying the necessary image-capturing condition, the necessary-image-capturing-condition setting unit 14 may be eliminated. In this case, monitoring-target-object image information is generated in which all the captured images including the image portion of the monitoring target object are associated with the image-capturing conditions, and the monitoring-target-object image information is transmitted to the provision destination.

Alternatively, the necessary-image-capturing-condition setting unit 14 may set, out of a plurality of image-capturing conditions determined based on at least one of the type of the monitoring target object and the monitoring purpose, an image-capturing condition that matches the positions of the monitoring target object and the mobile object as the necessary image-capturing condition. For example, in the case in which the position of the vehicle 50 matches "near", the necessary-image-capturing-condition setting unit 14 sets an image-capturing condition in agreement with "near" as the necessary image-capturing condition. Then, the captured-image selection unit 15 selects an image that matches the necessary image-capturing condition in agreement with "near", as the second image.

In the setting table illustrated in FIG. 4, in the case in which the monitoring target object is a utility pole, and the monitoring purpose is a hindrance object, distant image-capturing and near image-capturing are set as a plurality of image-capturing conditions. In this case, in the case in which the position of the vehicle 50 matches "near", the necessary-image-capturing-condition setting unit 14 sets, out of distant image-capturing and near image-capturing, near image-capturing as the necessary image-capturing condition.

Although the above embodiment uses the above image-capturing conditions (1) to (5), part of the above (1) to (5) may be used instead of all of them. Alternatively, other image-capturing conditions may be used. For example, if the resolution of the image portion of the monitoring target object in a captured image is used as an image-capturing condition, it is possible to show an index of how accurately the state of the monitoring target object can be recognized from the captured image. The resolution of the image portion of the monitoring target object in a captured image varies depending on the distance between the camera 51 and the monitoring target object, the number of pixels of the image capturing element in the camera 51, the magnification of the lens mounted on the camera 51, and the like. In addition, the image-capturing conditions may include the installation position of a monitoring target object on the road and a lane in which the vehicle 50 was traveling on the road when the camera 51 captured the image.

Although in the above embodiment, the necessary-image-capturing-condition setting unit 14 sets the necessary image-capturing condition based on the type of the monitoring target object and the monitoring purpose, the necessary image-capturing condition may be set based on only the type of the monitoring target object or only the monitoring purpose.

Note that FIG. 1 is a schematic diagram illustrating the configuration of the image collection system 1, divided according to the main processes to make it easy to understand the invention of the present application, and the configuration of the image collection system 1 may be divided differently. The processes of the constituents may be executed by one hardware unit or a plurality of hardware units. The processes of the constituents in the flowchart illustrated in FIG. 2 may be executed by one program or a plurality of programs.

4. Configurations Supported by Above Embodiments

The above embodiments support the following configurations.

(Configuration 1) An image collection system including: a captured-image analysis unit that determines whether a captured image, captured by a camera mounted on a mobile object, of surroundings of the mobile object is a first captured image including an image portion of a specified monitoring target object; an image-capturing-condition recognition unit that recognizes a first image-capturing condition that is an image-capturing condition at the time when the camera captures the first captured image; and a monitoring-target-object-information providing unit that transmits monitoring-target-object image information in which the first captured image and the first image-capturing condition are associated with each other, to a specified provision destination.

The image collection system of configuration 1 makes it possible to collect favorable captured images of monitoring target objects.

(Configuration 2) The image collection system according to configuration 1, in which the first image-capturing condition includes the distance between the mobile object and the monitoring target object.

With the image collection system according to configuration 2, it is possible to provide information indicating how far a monitoring target object was from the point where the image of the monitoring target object was captured.

(Configuration 3) The image collection system according to configuration 1 or 2, in which the first image-capturing condition includes the resolution of the image portion of the monitoring target object in the first captured image.

With the image collection system according to configuration 3, it is possible to provide information indicating how much resolution the image information on a monitoring target object has.

(Configuration 4) The image collection system according to configuration 1 to 3, in which the monitoring target object is a target object installed around a road, and the first image-capturing condition includes the installation position of the monitoring target object on the road and the traveling direction of the mobile object on the road at the time when the camera captures the first captured image.

With the image collection system according to configuration 4, it is possible to provide information indicating which direction the image of a monitoring target object was captured from.

(Configuration 5) The image collection system according to configuration 1 to 4, in which the monitoring target object is a target object installed around a road, and the first image-capturing condition includes the installation position of the monitoring target object on the road and a lane in which the mobile object is traveling on the road when the camera captures the first captured image.

With the image collection system according to configuration 5, it is possible to provide information indicating which lane of the road the image of a monitoring target object was captured from.

(Configuration 6) The image collection system according to configuration 1 to 5, further including: a necessary-image-capturing-condition setting unit that sets a necessary image-capturing condition based on at least one of the type and a monitoring purpose of the monitoring target object; and a captured-image selection unit that selects, out of the first captured images, a second captured image in which the first image-capturing condition satisfies the necessary image-capturing condition, in which the monitoring-target-object-information providing unit transmits the monitoring-target-object image information on the second captured image to the provision destination.

With the image collection system according to configuration 6, it is possible to provide captured images that were captured in conditions that match the type or the monitoring purpose of a monitoring target object.

(Configuration 7) The image collection system according to configuration 6, in which the necessary-image-capturing-condition setting unit sets, out of a plurality of image-capturing conditions determined based on at least one of the type and the monitoring purpose of the monitoring target object, an image-capturing condition that matches the positions of the monitoring target object and the mobile object, as the necessary image-capturing condition.

With the image collection system according to configuration 7, it is possible to set image-capturing conditions that match the position of the mobile object relative to a monitoring target object as the necessary image-capturing condition.

(Configuration 8) The image collection system according to configuration 6 or 7, in which the necessary image-capturing condition includes a condition that the distance between the monitoring target object and the mobile object is within a specified range.

With the image collection system according to configuration 8, it is possible to provide captured images captured from appropriate distances.

(Configuration 9) The image collection system according to configuration 6 to 8, in which the monitoring target object is a target object installed around a road, and the necessary image-capturing condition includes a condition that a lane in which the mobile object is traveling on the road when the camera captures the first captured image is a specified lane.

With the image collection system according to configuration 9, it is possible to provide captured images captured from a mobile object traveling in a lane suitable for capturing images of a monitoring target object.

(Configuration 10) An image collection method that is executed by a computer, including: a captured-image analysis step of determining whether a captured image, captured by a camera mounted on a mobile object, of surroundings of the mobile object is a first captured image including an image portion of a specified monitoring target object; an image-capturing-condition recognition step of recognizing a first image-capturing condition that is an image-capturing condition at the time when the camera captures the first captured image; and a monitoring-target-object-information providing step of transmitting monitoring-target-object image information in which the first captured image and the first image-capturing condition are associated with each other, to a specified provision destination.

The image collection method of configuration 10 being executed by a computer provides operational advantages the same as or similar to those of the image collection system according to configuration 1.

REFERENCE SIGNS LIST

1 image collection system
10 processor 11 surrounding-image capturing unit
12 captured-image analysis unit
13 image-capturing-condition recognition unit
14 necessary-image-capturing-condition setting unit
15 captured-image selection unit
16 monitoring-target-object-information providing unit
20 memory
21 control program
30 communication unit
50 vehicle (mobile object)
51 camera
52 radar
53 GNSS sensor
100 utility pole
101 hindrance object
102 crack
110 mailbox
200 communication network
210 power-company server
211 post-office server
212 maintenance-company server
213 repair-company server

What is claimed is:

1. An image collection system comprising a processor and a memory, wherein the processor functions as:
a captured-image analysis unit that determines whether a captured image, captured by a camera mounted on a mobile object, of surroundings of the mobile object is a first captured image including an image portion of a specified monitoring target object;
an image-capturing-condition recognition unit that recognizes a first image-capturing condition that is an image-capturing condition at a time when the camera captures the first captured image;
a monitoring-target-object-information providing unit that transmits monitoring-target-object image information in which the first captured image and the first image-capturing condition are associated with each other, to a specified provision destination;
a necessary-image-capturing-condition setting unit that sets a necessary image-capturing condition based on a type and a monitoring purpose of the specified monitoring target object; and
a captured-image selection unit that selects, out of a plurality of the first captured image, a second captured image in which the first image-capturing condition satisfies the necessary image-capturing condition,
wherein the processor,
by the function of the necessary-image-capturing-condition setting unit, according to a setting table stored in the memory in advance, sets the necessary image-capturing condition to determine whether the plurality of the first captured image is the second captured image that can be used for monitoring, the setting table including the type and the monitoring purpose of the specified monitoring target object, the image-capturing condition, and the specified provision destination corresponding to the specified monitoring target object, and
by the function of the monitoring-target-object-information providing unit, transmits, to the specified provision destination, the monitoring-target-object image information on the second captured image which is determined, by the function of captured-image selection unit, as the second captured image.

2. The image collection system according to claim 1, wherein
the first image-capturing condition includes a distance between the mobile object and the specified monitoring target object.

3. The image collection system according to claim 1, wherein
the first image-capturing condition includes a resolution of the image portion of the specified monitoring target object in the first captured image.

4. The image collection system according to claim 1, wherein
the specified monitoring target object is a target object installed around a road, and
the first image-capturing condition includes an installation position of the specified monitoring target object on the road and a traveling direction of the mobile object on the road at the time when the camera captures the first captured image.

5. The image collection system according to claim 1, wherein
the specified monitoring target object is a target object installed around a road, and
the first image-capturing condition includes an installation position of the specified monitoring target object on the road and a lane in which the mobile object is traveling on the road when the camera captures the first captured image.

6. The image collection system according to claim 1, wherein
the necessary-image-capturing-condition setting unit sets, based on the type and the monitoring purpose of the specified monitoring target object, the image-capturing condition to either a near image or a distant image.

7. The image collection system according to claim 1, wherein
the necessary image-capturing condition includes a condition that a distance between the specified monitoring target object and the mobile object is within a specified range.

8. The image collection system according to claim 1, wherein
the specified monitoring target object is a target object installed around a road, and
the necessary image-capturing condition includes a condition that a lane in which the mobile object is traveling on the road when the camera captures the first captured image is a specified lane.

9. An image collection method that is executed by a computer having a processor and a memory, comprising:
a captured-image analysis step of determining whether a captured image, captured by a camera mounted on a mobile object, of surroundings of the mobile object is a first captured image including an image portion of a specified monitoring target object;
an image-capturing-condition recognition step of recognizing a first image-capturing condition that is an image-capturing condition at a time when the camera captures the first captured image;
a monitoring-target-object-information providing step of transmitting monitoring-target-object image information in which the first captured image and the first image-capturing condition are associated with each other, to a specified provision destination;
a necessary-image-capturing-condition setting step of setting a necessary image-capturing condition based on a type and a monitoring purpose of the specified monitoring target object; and a captured-image selection step of selecting, out of a plurality of the first captured image, a second captured image in which the first image-capturing condition satisfies the necessary image-capturing condition, wherein the processor, in the function of the necessary-image-capturing-condition setting step, according to a setting table stored in the memory in advance, sets the necessary image-capturing condition to determine whether the plurality of the first captured image is the second captured image that can be used for monitoring, the setting table including the type and the monitoring purpose of the specified monitoring target object, the image-capturing condition, and the specified provision destination corresponding to the specified monitoring target object, and in the function of the monitoring-target-object-information providing step, transmitting, to the specified provision destination, the monitoring-target-object image information on the second captured image which is determined, in the function of the captured-image selection step, as the second captured image.

\* \* \* \* \*